United States Patent [19]

Pauwels

[11] 4,072,365
[45] Feb. 7, 1978

[54] MODULATOR FOR AN ADAPTIVE BRAKING SYSTEM

[75] Inventor: Edward M. Pauwels, South Bend, Ind.

[73] Assignee: The Bendix Corporation, South Bend, Ind.

[21] Appl. No.: 784,903

[22] Filed: Apr. 5, 1977

[51] Int. Cl.² .............................................. B60T 8/02
[52] U.S. Cl. ...................................... 303/115; 303/61
[58] Field of Search ................... 188/181 A; 303/6 R, 303/12, 61, 115

[56] References Cited

U.S. PATENT DOCUMENTS

| 3,790,224 | 2/1974 | Ritsema | 303/115 |
| 3,790,228 | 2/1974 | Adahan | 303/115 |
| 3,837,711 | 9/1974 | Van House et al. | 303/115 |
| 3,840,279 | 10/1974 | Pauwels | 303/115 |

*Primary Examiner*—Duane A. Reger
*Attorney, Agent, or Firm*—Paul David Schoenle; Ken C. Decker

[57] ABSTRACT

A vacuum powered modulator for an adaptive braking system includes a housing that defines a chamber. The housing also includes an inlet that communicates with a conventional master cylinder and an outlet that communicates with a brake wheel cylinder and a valve for regulating the communication between the master cylinder and the wheel cylinder. A pressure responsive member is movably disposed within the housing chamber to define a first cavity and a second cavity. The first cavity communicates with a vacuum source and a passage through the housing communicates the second cavity with the first cavity so that the second cavity is also in communication with the vacuum source in a normal condition. When a skidding condition is imminent, a sensor is actuatable to close communication between the first and second cavity via the passage and to vent the second cavity to atmosphere so that the pressure responsive member moves to cooperate with the valve to reduce the communication to the wheel cylinder. A seal between the pressure responsive member and a portion of the housing isolates the first cavity from the second cavity and the housing passage extends through the housing portion to communicate with the first cavity regardless of the position of the pressure responsive member.

11 Claims, 1 Drawing Figure

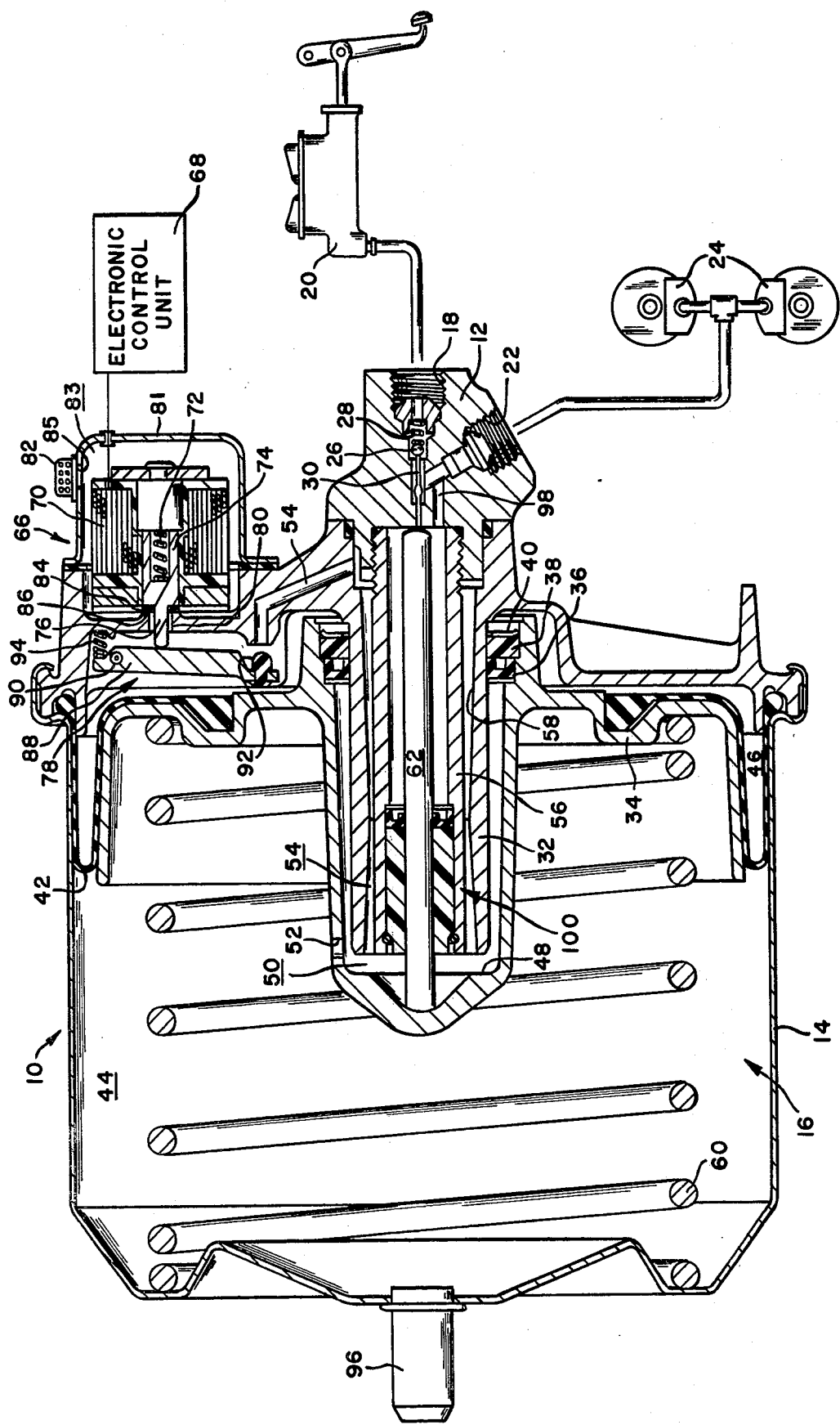

MODULATOR FOR AN ADAPTIVE BRAKING SYSTEM

BACKGROUND OF THE INVENTION

Vacuum powered modulators in an adaptive braking system are responsive to an output signal from a control unit to decrease the braking pressure in the brakes of the wheels controlled by the adaptive braking system. A pressure responsive member within the modulator is controlled by vacuum from the engine manifold and the pressure responsive member operates to control the braking pressure communicated to a wheel cylinder.

In view of the limited availability of vacuum from the engine manifold, the modulator is generally large to provide sufficient area contact with the pressure responsive member. Consequently, the modulator crowds the engine compartment which is already crowded with pollution control equipment.

In particular, several modulators include a bypass passage, as illustrated in U.S. Pat. No. 3,790,224, assigned to the same assignee, which adds to the bulky size of the modulator.

SUMMARY OF THE INVENTION

The present invention relates to a modulator having a pressure responsive member movably disposed within a housing. The pressure responsive member cooperates with a valve to control the communication of braking fluid to a wheel cylinder and defines a first cavity and a second cavity. A seal which is carried by the pressure responsive member slidably engages a boss on the housing and a passage extending through the boss communicates the first cavity with the second cavity so that a vacuum source communicates with the first cavity and the second cavity via the passage.

When skidding is imminent during a braking application, a sensor responds to the output of a controller associated with the braking wheels to close the passage and vent the second cavity to atmosphere. Consequently, the pressure responsive member moves as a result of a pressure differential across the member to adjust the valve to decrease the pressure of the braking fluid communicating with the braking wheels. When skidding is not imminent, the sensor responds to the output of the controller to open the passage so that the first cavity and the second cavity communicate with the vacuum source and the pressure responsive member moves to adjust the valve to permit free communication between the brake master cylinder and the wheel cylinder.

Therefore, an important object of my invention is to provide a simple modulator of small construction and, in particular, to eliminate the exterior bypass passage by providing an interior bypass passage within the modulator housing.

DESCRIPTION OF THE DRAWINGS

The sole FIGURE of the drawings is a schematic illustration of a vehicle braking system with a modulator, made according to the teachings of my invention, illustrated in cross section.

DETAILED DESCRIPTION

Referring now to the drawing, a modulator 10 according to the present invention is illustrated in cross section. The modulator 10 includes a housing 12 with a cover 14 forming a chamber 16 within the housing 12.

The housing 12 is provided with an inlet 18 communicating with a master brake cylinder 20 and an outlet 22 communicating with the brakes 24 of the wheels controlled by the modulator 10. A valve 26 is biased by a spring 28 to a position closing the communication between inlet 18 and outlet 22 while a stem 30 engages the valve 26 and opposes the spring 28.

The housing 12 forms a boss 32 for slidably mounting a pressure responsive member 34 via seal 36 which slidably engages the boss. The seal 36 is carried by the pressure responsive member 34 adjacent a bearing 38 by means of snap rings 40. The pressure responsive member 34 also carries a flexible diaphragm 42 and defines a first cavity 44 and a second cavity 46 on opposite sides of the member 34. The central portion of member 34 is recessed at 48 to receive boss 32 and the portion at 48 cooperates with the seal 36 to define a third cavity 50 which communicates with the first cavity 44 via a calibrated orifice opening 52. The third cavity 50 also communicates with the first cavity 46 via a passage 54 extending through the boss 32 and housing 12. In particular, a sleeve 56 is threadably engaged with the housing 12 to form a clearance with a double slanted bore 58 within the boss 32 and this clearance defines the portion of passage 54 extending through the boss 32. The calibrated orifice opening 52 cooperates with the bore 58 to control the flow of fluid from cavity 46 to cavity 44.

A spring 60 urges the pressure responsive member to the right in order to position a plunger 62 against the stem 30 such that the valve 26 is maintained in an open condition to permit communication between the master brake cylinder 20 and the brakes 24.

A sensor 66 is carried by the housing 12 and is operatively connected to an electronic control unit 68 such that an output signal from the unit 68 energizes the sensor. The electronic control unit monitors the acceleration of the wheel to be braked to provide an output signal when skidding is imminent. The sensor 66 comprises a coil 70, a spring 72, an armature 74, a projection 76 and a valve member 78. The coil 70 is electrically energized to control the movement of projection 76 within opening 80 and the projection 76 is engageable with the valve member 78 to control communication between the second cavity 46 and the first cavity 44 via the third cavity 50 and opening 52.

A filter 82 on a cap 83 communicates the atmosphere via cap opening 85 with opening 80 when the seal 84 carried by armature 74 is spaced from the valve seat 86 surrounding opening 80. The valve member 78 comprises a beam 88 pivotal on pin 90 and a resilient tab 92 which is urged into closing engagement with passage 54 by means of spring 94.

A conduit 96 communicates the chamber 16 with a vacuum source (not shown) such as an engine manifold.

MODE OF OPERATION

When a normal braking application occurs, pressurized fluid from the master brake cylinder 20 communicates with the brakes 24 via inlet 18 and outlet 22. As no skidding condition is imminent with the wheels of brakes 24, the valve 26 remains in an open position because of the resilient force of spring 60 urging the pressure responsive member 34, plunger 62 and stem 30 to the right viewing the FIGURE. In the normal braking application a vacuum source communicates via conduit 96 with the first cavity 44, via calibrated orifice 52 with the third cavity 50 and via passage 54 with the second cavity 46. Consequently, with all the cavities communicating with the vacuum source the spring 60 maintains the pressure responsive member 34 in the position illustrated to maintain valve 26 open.

When a skidding condition is imminent in the wheels associated with brakes 24, the electronic control unit 68 generates an output signal which energizes sensor 66. The energized coil 70 urges the armature 74 to the right, viewing the FIGURE, so that the projection 76 also moves to the right to enable spring 94 to pivot beam 88 counterclockwise about pin 90, thereby positioning resilient tab 92 in sealing engagement with the opening of passage 54 which is communicating with the second cavity 46. Moreover, with armature 74 moved to the right, the seal 84 is spaced from the valve seat 86. Consequently, the second cavity 46 is vented to atmosphere via opening 80 and opening 85.

With passage 54 closed and cavity 46 open to atmosphere, a pressure differential occurs across the pressure responsive member 34 causing the same to move to the left, thereby overcoming spring 60. This movement of member 34 enables spring 28 to move the valve 26, stem 30 and plunger 62 to the left resulting in closing communication between the master brake cylinder 20 and the brakes 24. In addition, with the valve 26 closed, further movement of member 34 to the left permits the movement of plunger 62 to the left, thereby communicating pressurized fluid from the brakes 24 via a bypass passage 98 to the vacated space formed by the plunger 62 telescoping into the seal and guide 100. This communication of pressurized fluid into the space vacated by the telescoping plunger reduces the pressure of fluid communicating with the brakes 24 in order to reduce the braking and avert a skidding condition. Moreover, the fluid within the space is communicated to the brakes 24 when skidding is no longer imminent, as the plunger 62 moves to the right expelling the fluid from the vacated space by means of the bypass passage 98.

With a skidding condition no longer imminent, the electronic control unit 68 stops generating an output signal and the sensor 66 returns to a normal condition. Spring 72 moves armature 74 to the left abutting seal 84 with seat 86 to close cavity 46 to atmosphere. Projection 76 engages beam 88 to separate resilient tab 92 from passage 54. As cavity 46 is again communicated with the vacuum source via passage 54 and calibrated orifice 52, fluid within cavity 46 is withdrawn therefrom, but only at a rate determined by the restriction of passage 54 and calibrated orifice 52. Therefore, the pressure responsive member 34 does not jump to the right due to a pressure differential thereacross, but moves smoothly to the right to open valve 26, after plunger 62 has expelled the pressurized fluid from the vacated space, thereby communicating additional pressurized fluid to brakes 24 at a gradual rate depending on the opening of valve 26 and the movement of plunger 62 to the right. This smooth return of pressure responsive member 34 eliminates any surge in pressure buildup to brakes 24 which would result in a second imminent skidding condition.

It is noted that the passage 54 is disposed internally of the housing 12 in accordance with the invention in order to eliminate bulky passages or tubes extending around the periphery of the housing. Moreover, the seal 36 and resilient tab 92 isolate the cavity 46 from the cavity 44 when the resilient tab closes passage 54 so that only the cavity 46 is exposed to atmosphere when the sensor 66 is energized. Therefore, a pressure differential can occur across pressure responsive member 34 to move the same to avert a skidding condition in the manner already mentioned.

Although the opening 52 is calibrated, it is apparent that a calibrated restriction anywhere within passage 54 will provide a similar operation for the present invention.

Various alternatives, modifications and variations are apparent to one skilled in the art in view of the foregoing description. Accordingly, it is intended to cover all such alternatives, modifications and variations within the scope of the appended claims.

I claim:

1. A modulator for an adaptive braking system comprising:
    a housing defining a chamber therewithin and having an inlet, an outlet and valve means for regulating fluid communication between the inlet and outlet;
    a pressure responsive member movable within said chamber and forming a first cavity and a second cavity within said housing;
    sealing means disposed between said pressure responsive member and said housing and forming a third cavity between said pressure responsive member and said housing, said third cavity communicating with said first cavity via an opening on said pressure responsive member;
    a passage communicating said second cavity with said third cavity; and
    sensing valve means normally opening said passage to communicate said second cavity with said third cavity, said sensing valve means being actuatable from a normal position to an applied position to close said passage.

2. The modulator of claim 1 in which said housing includes a boss extending into said chamber, said sealing means slidably engaging said boss and said passage extending through said boss.

3. The modulator of claim 1 in which the opening between said third and first cavities is a calibrated orifice controlling the fluid communication therethrough.

4. The modulator of claim 1 wherein said sensing valve means comprises a sensor responsive to the output of a controller in the adaptive braking system and a valve member, said sensor cooperating with said valve member to open said passage between said second cavity and said third cavity when said sensor is in a normal position and to close said passage between said second cavity and said third cavity when said sensor is in an applied position.

5. A modulator for an adaptive braking system comprising:
    a housing defining a chamber and having an inlet, an outlet and a valve means for regulating fluid communication between the inlet and the outlet, said housing including a boss extending into the chamber;
    a pressure responsive member sealingly engaging the boss and separating the chamber into a first cavity and a second cavity;
    a passage extending through the boss and communicating the first cavity with the second cavity;
    a valve member cooperating with said passage to open and close communication therethrough; and
    a sensor engaging said valve member, said sensor being movable in response to an output of a controller for the adaptive braking system in order to actuate said valve member.

6. The modulator of claim 5 in which said pressure responsive member includes an orifice communicating said passage with the first cavity.

7. The modulator of claim 5 in which the boss forms a bore therewithin, a plunger extends from said pressure responsive member to the valve means and is movable with said pressure responsive member to open and close the valve means and a sleeve is disposed within the bore to mount said plunger and to form a clearance with the bore, the clearance defining a portion of said passage.

8. The modulator of claim 5 in which said valve member comprises a beam resiliently urged to a position closing said passage and said sensor being engageable with said beam when said sensor is in a normal position to bias said beam to a position opening said passage.

9. The modulator of claim 5 in which said sensor engages said housing to close a housing opening to atmosphere in a normal position, said sensor being actuatable to move to open the housing opening to atmosphere whereby said second cavity communicates with the atmosphere, said sensor including a projection extending through the housing opening and being engageable with said valve member in the normal position to communicate said passage with said second cavity.

10. A modulator for an adaptive braking system comprising:
 a housing defining a chamber therewithin and having an inlet, an outlet and valve means for regulating fluid communication between the inlet and outlet;
 a pressure responsive member movable within said chamber to form a pair of variable volume cavities within said housing, said cavities communicating with each other via a passage within said housing; and
 a sensing means cooperating with the passage and an output of a controller for the adaptive braking system in order to open and close communication through the passage;
 said pressure responsive member sealingly engaging a portion of said housing and said portion of said housing including the passage communicating with the cavities.

11. The modulator of claim 10 in which the passage communicating said variable volume cavities includes a flow restriction.

* * * * *